(12) United States Patent
Lawandy et al.

(10) Patent No.: US 6,338,933 B1
(45) Date of Patent: Jan. 15, 2002

(54) METHODS AND APPARATUS FOR RENDERING AN OPTICALLY ENCODED MEDIUM UNREADABLE

(75) Inventors: Nabil M. Lawandy, North Kingstown, RI (US); Charles M. Zepp, Hardwick; Kenneth S. Norland, Lexington, both of MA (US)

(73) Assignee: SpectraDisc Corporation, Providence, RI (US)

( * ) Notice: Subject to any disclaimer, the term of this patent is extended or adjusted under 35 U.S.C. 154(b) by 0 days.

(21) Appl. No.: 09/338,959

(22) Filed: Jun. 24, 1999

Related U.S. Application Data

(60) Provisional application No. 60/090,682, filed on Jun. 25, 1998.

(51) Int. Cl.[7] .................................................. G11B 3/70
(52) U.S. Cl. ............................ 430/270.1; 430/270.15; 430/945; 430/19; 369/286; 369/283; 369/275.1
(58) Field of Search ................................. 369/286, 283, 369/275.1; 430/19, 270.15, 270.1, 945

(56) References Cited

U.S. PATENT DOCUMENTS

| 4,237,211 A | * | 12/1980 | Fanselow | 430/19 |
| 4,380,769 A | * | 4/1983 | Thomas et al. | 430/270.15 |

(List continued on next page.)

FOREIGN PATENT DOCUMENTS

| DE | 3720233 | | 12/1988 | | |
| EP | 0524242 | * | 12/1994 | | |
| JP | 01-211285 | | 8/1989 | | |
| JP | 401252902 A | | 10/1989 | | G02B/5/18 |
| JP | 02-018728 | * | 1/1990 | | |
| JP | 4-128834 | | 4/1992 | | |
| JP | 4-318342 | | 11/1992 | | |
| JP | 05-297627 | * | 11/1993 | | 430/19 |
| JP | 6-082952 | | 3/1994 | | |
| JP | 09-011619 | * | 1/1997 | | |
| JP | 411053767 A | | 2/1999 | | G11B/7/24 |
| WO | WO98/11539 | * | 3/1998 | | |

OTHER PUBLICATIONS

*International Search Report.* Patent Cooperation Treaty. International Application No. PCT/US00/41231. Dated Apr. 5, 2001.

(List continued on next page.)

*Primary Examiner*—Martin Angebranndt
(74) *Attorney, Agent, or Firm*—Harrington & Smith LLP (57) ABSTRACT

Methods and apparatus are provided for making an optically readable media unreadable. The method includes steps of (a) providing the media with an optically activated mechanism that degrades the reflectivity of a surface wherein information is encoded; (b) exposing the media to optical radiation for reading out the information; and, during the step of exposing, (c) initiating the operation of the optically activated mechanism. In this embodiment the step of initiating includes steps of (d) generating singlet oxygen in a layer disposed on the media; and (e) reacting the singlet oxygen with a metal-containing layer for oxidizing the surface of the metal-containing layer, thereby degrading the reflectivity of the surface. In a further aspect the optically activated mechanism causes a defocusing of a readout beam, thereby degrading reflection of the readout beam from a surface wherein information is encoded. In another embodiment the method deforms a surface of the layer resulting in readout beam aberration or in an inability to correctly stay on track. In another embodiment a portion of the surface is removed to the atmosphere, such as by evaporation of sublimation. In this embodiment a layer of the media is comprised of a volatile component and at least one other component. Removing at least some of volatile component by evaporation or sublimation causes an increase in at least one of photoabsorption or scattering or surface roughness with the remaining component, thereby rendering at least a portion of encoded information of the media unreadable, or affecting the tracking operation.

32 Claims, 5 Drawing Sheets

U.S. PATENT DOCUMENTS

| | | | |
|---|---|---|---|
| 4,478,768 A | | 10/1984 | Takeoka et al. ............. 264/1.4 |
| 4,527,173 A | * | 7/1985 | Gupta et al. ................. 430/945 |
| 4,542,288 A | | 9/1985 | Drexler ...................... 235/487 |
| 4,578,690 A | | 3/1986 | Veillette et al. ............. 346/212 |
| 4,584,641 A | | 4/1986 | Guglielmino .................. 380/5 |
| 4,677,604 A | | 6/1987 | Selby, III et al. ............. 369/33 |
| 4,734,796 A | | 3/1988 | Grynberg et al. ............. 371/42 |
| 4,735,839 A | * | 4/1988 | Sato et al. ............. 430/270.19 |
| 4,785,361 A | | 11/1988 | Brotby .......................... 380/3 |
| 4,849,836 A | | 7/1989 | Kachikian .................... 369/32 |
| 4,865,942 A | | 9/1989 | Gottschalk et al. ......... 430/138 |
| 4,866,769 A | | 9/1989 | Karp ............................. 380/4 |
| 4,879,704 A | | 11/1989 | Takagi et al. ................. 369/84 |
| 4,933,377 A | * | 6/1990 | Saeva et al. ............. 430/280.1 |
| 4,975,898 A | | 12/1990 | Yoshida ....................... 360/60 |
| 4,980,782 A | | 12/1990 | Ginkel .......................... 380/4 |
| 5,028,109 A | | 7/1991 | Lawandy ................. 350/96.12 |
| 5,050,213 A | | 9/1991 | Shear ............................ 380/4 |
| 5,053,339 A | * | 10/1991 | Patel ............................. 436/2 |
| 5,162,989 A | | 11/1992 | Matsuda ........................ 705/1 |
| 5,183,763 A | | 2/1993 | Mallow et al. ............. 436/106 |
| 5,185,233 A | * | 2/1993 | Santo ......................... 430/945 |
| 5,267,311 A | | 11/1993 | Bakhoum |
| 5,293,422 A | | 3/1994 | Loiacono ....................... 380/3 |
| 5,311,494 A | | 5/1994 | Sugita et al. ............... 369/100 |
| 5,322,747 A | | 6/1994 | Hugle .......................... 380/25 |
| 5,346,654 A | | 9/1994 | Kodaka et al. ............ 264/1.33 |
| 5,370,970 A | * | 12/1994 | Tanaka et al. ............. 430/945 |
| 5,371,792 A | | 12/1994 | Asai et al. .................... 360/60 |
| 5,373,499 A | | 12/1994 | Inaino et al. ................ 369/100 |
| 5,384,221 A | * | 1/1995 | Savant et al. ................. 430/19 |
| 5,400,319 A | | 3/1995 | Fite et al. ................. 369/275.5 |
| 5,412,718 A | | 5/1995 | Narasimhalu et al. ......... 430/1 |
| 5,418,852 A | | 5/1995 | Itami et al. ................... 369/14 |
| 5,426,625 A | | 6/1995 | Bui et al. ................. 369/44.32 |
| 5,432,647 A | | 7/1995 | Tateishi ......................... 380/4 |
| 5,448,551 A | * | 9/1995 | Miyagawa et al. ......... 369/271 |
| 5,453,968 A | | 9/1995 | Veldhuis et al. .............. 360/60 |
| 5,461,239 A | | 10/1995 | Atherton ..................... 250/566 |
| 5,473,584 A | | 12/1995 | Oshima ........................ 360/60 |
| 5,510,163 A | | 4/1996 | Sullivan et al. ............. 428/64.1 |
| 5,513,169 A | | 4/1996 | Fite et al. .................... 369/272 |
| 5,513,260 A | | 4/1996 | Ryan ............................. 380/4 |
| 5,538,773 A | | 7/1996 | Kondo ....................... 428/64.1 |
| 5,570,379 A | | 10/1996 | Sasaki et al. ................. 360/60 |
| 5,572,589 A | | 11/1996 | Waters et al. .................. 380/4 |
| 5,574,787 A | | 11/1996 | Ryan ............................. 380/4 |
| 5,587,984 A | | 12/1996 | Owa et al. ................... 369/103 |
| 5,592,454 A | | 1/1997 | Tobita et al. .................. 369/58 |
| 5,598,399 A | | 1/1997 | Ogihara et al. ........... 369/275.2 |
| 5,608,717 A | | 3/1997 | Ito et al. ................... 369/275.3 |
| 5,629,914 A | | 5/1997 | Clark et al. ................... 369/59 |
| 5,636,096 A | | 6/1997 | Mardirossian .............. 360/133 |
| 5,636,292 A | | 6/1997 | Rhoads ....................... 382/232 |
| 5,644,566 A | | 7/1997 | Nakayama et al. ...... 369/275.2 |
| 5,646,920 A | | 7/1997 | Raczynski .................... 369/47 |
| 5,661,703 A | | 8/1997 | Moribe et al. ................. 369/14 |
| 5,671,202 A | | 9/1997 | Brownstein et al. ........... 369/58 |
| 5,680,383 A | | 10/1997 | Clark et al. ................... 369/59 |
| 5,681,633 A | | 10/1997 | Onagi et al. ................ 428/64.3 |
| 5,815,484 A | | 9/1998 | Smith et al. .............. 369/275.1 |
| 5,846,836 A | | 12/1998 | Mallow ....................... 436/169 |
| 5,963,536 A | * | 10/1999 | Vasic et al. .............. 369/275.4 |
| 6,011,772 A | * | 1/2000 | Rollhaus et al. ............. 369/286 |
| 6,038,207 A | * | 3/2000 | Wachi ..................... 369/275.4 |
| 6,083,667 A | * | 7/2000 | Nishizawa et al. ......... 430/321 |
| 6,087,075 A | | 7/2000 | Kler et al. ................... 430/321 |

OTHER PUBLICATIONS

Kumar, Jayant et al., "Gradient force: The mechanism for surface relief grating formation in azobenzene functionalized polymers", Applied Physics Letters, vol. 72, No. 17, 4/27/98, pp. 2096–2098.

Pohlman, Ken C., "Compact–Disc Player", Scientific American, 9/98, p. 109.

International Search Report dated Sep. 30, 1999.

* cited by examiner

FIG.8

METHODS AND APPARATUS FOR RENDERING AN OPTICALLY ENCODED MEDIUM UNREADABLE

CLAIM OF PRIORITY FROM A COPENDING PROVISIONAL PATENT APPLICATION

Priority is herewith claimed under 35 U.S.C. §119(e) from copending Provisional Patent Application 60/090,682, filed Jun. 28, 1998. The disclosure of this Provisional Patent Application is incorporated by reference herein in its entirety.

FIELD OF THE INVENTION

This invention relates to optically readable data storage media and, more particularly, to techniques to render said media unreadable after being read at least once.

BACKGROUND OF THE INVENTION

It is often desirable when distributing software or other information that is recorded on a medium to insure that only one party is enabled to read the recorded information. For example, a company that sells computer software will find it advantageous to enable only the purchaser to read the software from a disk and transfer or install the software to computer memory, such as a hard disk, while preventing subsequent access by other parties to the software. However, this has proven to be a vexing problem that is not readily solved.

When the information is distributed on a read/write medium, such as the ubiquitous floppy disk, it may be possible to cause the installation software to erase all or part of the information after it has been successfully installed. Unfortunately, such information may be distributed on write-protected disks, thereby rendering such erasure impossible. Also, any protection mechanism that relies on computer software to implement has the potential to be defeated by additional computer software.

U.S. Pat. No. 5,815,484 discloses an optical disk having a reflective metallic layer with a plurality of data structures (pits and lands) and a reactive compound superimposed over at least some of the data structures. The reactive compound is a photochromic compound which changes from an optically transparent condition to an optically opaque condition when subjected to readout light and/or atmospheric oxygen. The darkening of the photochromic compound prevents a sufficient amount of readout light from being detected by the readout apparatus, thereby effectively rendering the optical disk unreadable.

At least one perceived disadvantage of this approach is that photochromic darkening is often reversible, which could be used to defeat the technique.

OBJECTS OF THE INVENTION

It is a first object and advantage of this invention to provide an improved system and method to render an optically readable media, such as, but not limited to, a laser disk, a compact disk (CD), or a digital video disk (DVD), unreadable.

It is a second object and advantage of this invention to provide an improved system and method to render an optically readable media permanently unreadable, after having been read at least once.

It is a third object and advantage of this invention to provide an optically activated mechanism that destroys or impairs the reflectivity of a metal-containing layer, thereby rendering an optically readable media unreadable.

It is a further object and advantage of this invention to provide an optically activated mechanism that modifies a transparent layer so as to cause readout beam aberration, thereby rendering an optically readable media unreadable.

It is once further object and advantage of this invention to provide a mechanism that relies on non-atmospheric oxygen, such as oxygen preloaded into or generated within a layer of an optically readable media, for modifying the optical properties of the media so as to render the media optically unreadable.

It is still another object and advantage of this invention to provide a mechanism that relies on an evaporative technique for modifying the optical properties of an optically readable media so as to render the media optically unreadable.

It is another object and advantage of this invention to provide a mechanism that alters a surface characteristic of an optically readable media so as to detrimentally affect a readout apparatus tracking process during an attempted readout of the media.

It is a further object and advantage of this invention to provide a mechanism that causes surface topography changes to an optically readable media so as to detrimentally affect a readout apparatus feedback and tracking process, thereby adversely affecting the fidelity of the readout.

SUMMARY OF THE INVENTION

The foregoing and other problems are overcome and the objects and the advantages of the invention are realized by methods and apparatus in accordance with embodiments of this invention.

In one aspect this invention provides a method for making an optically readable media unreadable during a play process. The method includes steps of (a) providing the media with an optically activated mechanism that degrades the reflectivity of a surface wherein information is encoded; (b) exposing the media to optical radiation for reading out the information; and, during the step of exposing, (c) initiating the operation of the optically activated mechanism. In this embodiment the step of initiating includes steps of (d) generating singlet oxygen in a layer disposed on the media; and (e) reacting the singlet oxygen with a metal-containing layer for oxidizing the surface of the metal-containing layer, thereby degrading the reflectivity of the surface. The step of generating may include a step of diffusing the singlet oxygen through a diffusion barrier that is disposed between the layer and the metal-containing layer.

In a further aspect the optically activated mechanism causes a defocusing of a readout beam, thereby degrading reflection of the readout beam from a surface wherein information is encoded.

In one embodiment the method generates an optical intensity gradient in a layer disposed on the media; and, in response to the generated gradient, deforms a surface of the layer resulting in readout beam aberration and/or adversely affecting the tracking process, resulting in readout degradation and a loss of fidelity. In this case the step of providing provides the layer so as to comprise an azobenzene-containing polymer. In an alternate embodiment a surface layer may react with an atmospheric component, such as oxygen, so as to degrade the tracking process by inducing a surface topography change, without inducing any significant change in the light transmission properties of the surface layer.

In another embodiment the step of initiating includes steps of: irradiating a photocurable polymer region that comprises part of the media; and, in response to the irradiation, photopolymerizing the polymer, thereby changing an index of refraction of the polymer resulting in readout beam aberration.

This invention also encompasses optically encoded media that operate in accordance with the foregoing methods, and that are constructed in accordance with the techniques of this invention.

In accordance with further embodiments of this invention an optically readable media has a patterned structure for encoding information that can be readout by application of light, and further includes a layer that is comprised of a volatile component and at least one other component. Removing at least some of volatile component by evaporation or sublimation causes an increase in at least one of photoabsorption or scattering with the remaining component, thereby rendering at least a portion of the encoded information unreadable. The other component can include a lactone dye, such as crystal violet lactone, and the volatile component can be, for example, NMP (N-methyl pyrrolidinone). In a further embodiment an organic material, such as CsF or KBr, is coated on the surface of the disk and provides a surface haze when exposed to water vapor or carbon dioxide, thereby increasing the scattering and decreasing the signal-to-nose ratio, and degrading the readout fidelity.

A method is disclosed for making an optically readable media unreadable. This method includes steps of (a) providing the media with a surface layer having a planar surface topography; and (b) subsequent to or during a first readout of the optically readable media, modifying at least a portion of the planar surface topography to a non-planar surface topography. This is accomplished by the use of at least one of a photoresponsive polymer, a removal of a substance from the surface layer to the atmosphere, or by interaction with a substance in the atmosphere. This latter process may occur without significantly modifying a transparency of the surface layer to a readout beam. The deviation of the non-planar surface layer topography from the planar surface layer topography is sufficient to detrimentally affect least a tracking operation of a readout device that generates the readout beam.

BRIEF DESCRIPTION OF THE DRAWINGS

The above set forth and other features of the invention are made more apparent in the ensuing Detailed Description of the Invention when read in conjunction with the attached Drawings, wherein.

DESCRIPTION OF THE INVENTION

Figure 1:
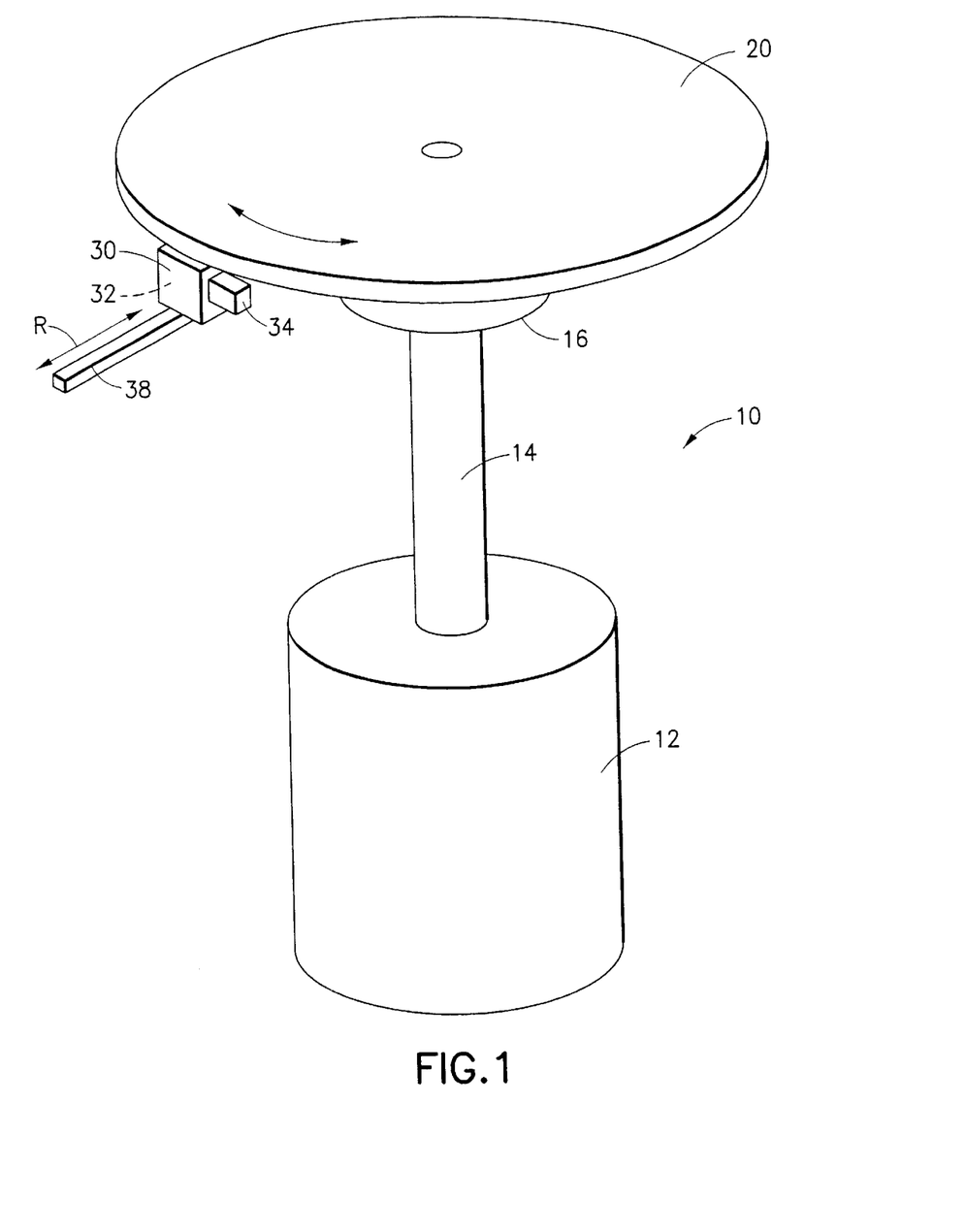
FIG. 1 is a schematic diagram of a conventional optical scanning system for reading an optically readable disk that incorporates one or more features of the present invention.

Referring now to FIG. 1, there is shown a schematic diagram of an optical scanning system 1 for reading an optically readable disk that incorporates one or more features of the present invention. Although the present invention will be described with reference to the embodiments shown in the drawings, it should be understood that the present invention may be embodied in many forms of alternative embodiments. In addition, any suitable size, shape or type of materials or elements could be used.

It should further be noted at the outset that as employed herein an "optically encoded" or "optically readable" media or medium is intended to cover a number of various devices wherein data, audio and/or video information is stored such that it can be readout when a lightbeam (either visible light or invisible light) is applied to the device. Such devices include, but are not limited to, laser disks, compact disks (CDs), CD-ROMs, and digital video or versatile disks (DVDs), as well as certain kinds of tape. In general, the devices of interest to this invention incorporate some type of structure that is capable of altering the reflectivity of the device to the readout light such that a logic 1 bit can be distinguished from a logic 0 bit. By rendering such a device "unreadable" it should be understood that it is not necessary to make the entire device unreadable. For example, it may be necessary to make only a relatively small portion of a boot record or a directory of contents unreadable such that the entire device becomes unusable, or such that some predetermined portion of the device becomes unusable. Making the device unreadable may also encompass adversely affecting the readout device optical feedback and tracking process, such as by altering the surface topography. By example, in this case the readout laser focus adjustments may not be able to react quickly enough to the surface profile changes, resulting in an inability to maintain the correct tracking. This has been found to manifest itself as "skipping" through a music segment of a compact disk, or to otherwise negatively impact the fidelity of the output.

The optical scanning system 1, which may be conventional in construction, generally comprises a disk drive 10 and an optical scanning head 30. The disk drive 10 is generally adapted to move an optically readable disk 20, such as a CD-ROM, relative to the optical scanning head 30. In the embodiment shown in FIG. 1, the optical scanning head 30 is located below the optical disk 20 for scanning a lower surface of the disk, though in other embodiments the scanning head may located to scan an upper surface of the disk. The scanning head 30 is preferably held by a movable carriage or arm (not shown) so that the head 30 may be moved relative to a center of the disk. For example, the scanning head may be able to translate radially relative to the center of the disk 20 or circumferentially around the center of the disk. In alternate embodiments, the optical scanning head may be fixedly held relative to the center of the optically readable disk. As the disk 20 moves over the scanning head 30, the head reads optically readable data structures 23 (see FIG. 2) disposed on the disk 20.

Referring still to FIG. 1, the disk drive 10 includes a motor 12, a drive shaft 14 and a disk support or chuck 16. The drive shaft 14 operably connects the motor 12 to the chuck 16. Thus, when energized the motor 12 rotates the chuck 16 through the drive shaft 14. The chuck 16 comprises appropriate holding means (not shown) to stably hold the disk 20 thereon when the chuck 16 is rotated by the motor 12. The motor 12 is adapted to rotate the chuck 16 and the disk 20 held thereon at predetermined speeds. The motor 12 may operate to rotate the disk 20 at a variable rotational velocity so that the disk presents a reading surface to the scanning head 30 which moves at a constant linear velocity. For example, as the scanning head 30 is radially translated closer to the center of the disk 20 on the chuck 16, the motor 12 spins the disk 20 at an increasing rotational velocity. Thus, the portion of the disk 20 passing over the scanning head 30 is moving at a constant linear velocity. It is noted that in conventional laser disks, the data structure is generally disposed in a single track spiralling from the edge of the disk towards the center which requires that the disk spin at a variable rate of rotation in order for the track to move at a constant linear speed relative to the scanning head. By way of example, the disk drive 10 may rotate a DVD at an appropriately increasing rate of rotation to provide a linear velocity of about 3.5 m/sec over the scanning head 30.

Figure 2:
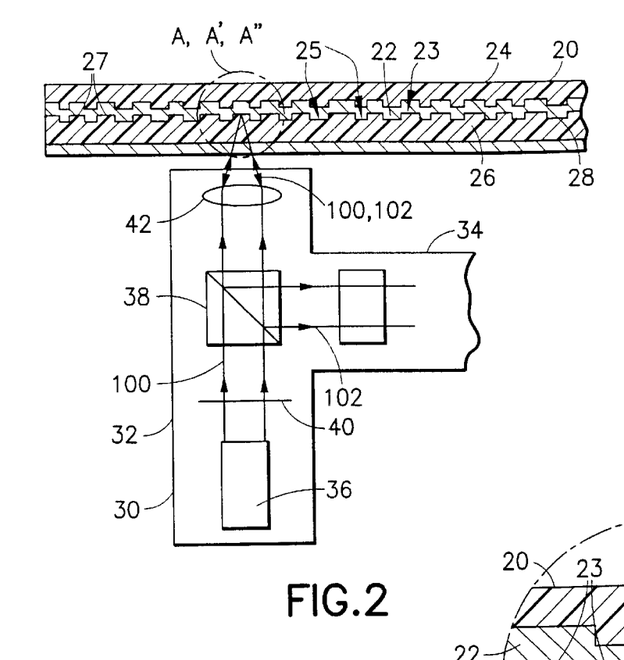
FIG. 2 is a schematic side elevation and partial cross-sectional view of an optical scanning head of the optical scanning system scanning the optically readable disk of FIG. 1.

Referring now to FIG. 2, the scanning head 30 generally includes a light source 32 and a photodetector 34. The light source 32 generates and directs an incident or interrogating beam 100 of electromagnetic radiation (also referred to herein as optical radiation) against the optical disk 20. The optical disk 20 includes a reflective layer 22 with data structures 23 formed thereon or therein. The interrogating beam 100 of electromagnetic radiation directed against the optical disk 20 is reflected by the reflecting layer 22 as a reflected beam 102. The reflected beam 102 is then detected by then photodetector 34 of the optical scanning head 30. When the disk drive 10 rotates the disk 20 relative to the scanning head 30, the interrogating beam 100 passes over the data structures 23 on the reflective layer 22 of the disk. As the interrogating beam 100 moves over the data structures 23, the data structures modulate the reflected beam 102. The modulation in the reflected beam 102 is registered at the photodetector 34 of the scanning head 30 and converted to electrical signals.

More particularly, and by way of example, the light source 32 may include a laser diode 36 or other such suitable device for generating the interrogating beam 100 of optical radiation. The beam 100 generated by the laser diode 36 may be directed through a quarter wave plate 40 and through polarizing beam splitter 38 as shown in FIG. 2. Alternatively, the positions of the wave plate and beam splitter may be reversed so that the beam passes first through the beam splitter and then through the wave plate. Also, the beam generated by the laser diode 36 may be collimated by a collimator (not shown) before encountering the wave plate 40. After the interrogating beam 100 passes through the beam splitter 38, the beam encounters an appropriate lens 42 which focuses the interrogating beam 100 at a predetermined focal point. The interrogating beam 100 emitted by the light source 30 may have a wavelength of about 650 nm, although the beam may have other wavelengths. The interrogating beam 100 may be focused to a spot size of approximately $0.63 \mu m$. The depth of focus of the beam 100 is about $0.9 \mu m$, though this depth may be adjusted as required. The interrogating beam 100 is modulated by an appropriate modulator (such as an acousto-optic or electro-optic modulator, not shown) to effect a residence time per bit of between about 100–200 nsec. The laser diode 36 is otherwise adapted to deliver approximately 1 mW of power on the optical disk 20. The energy deposited per bit by the interrogating beam 100 is about 200 pJ and the fluence of the beam on the focus spot is about 50 $mJ/cm^2$. Therefore, the intensity of the interrogating beam 100 on the focus spot is about 300 $kW/cm^2$. In alternate embodiments, the light source may have any other suitable configuration to generate an interrogating beam of electromagnetic radiation having appropriate characteristics for reading data structures from an optical disk.

Still referring to FIG. 2, the reflective layer 22 of the laser disk 20 is disposed between an upper protective layer 24 and a lower layer 26. The construction of the lower layer 26 will be described in greater detail below with reference to the three preferred embodiments of this invention. The reflective layer 22 may be comprised of metal such as aluminum, though other suitable materials may be used, and which is formed by appropriate means to provide a reflecting surface 28 to the interrogating beam 100. As mentioned previously, the reflective surface 28 of layer 22 is encoded with information stored as data structures 23. The data structures 23 are adapted to change the reflected beam 102 when the interrogating beam 100 is incident on features of the data structures 23. For example, the data structures 23 may comprise a pattern of lands 25 and pits 27 formed in the reflective surface 28 of the optical disk 20. The lands 25 are raised portions on the reflective surface 28 of the optical disk. The pits 27 are depressed portions (relative to the lands 25) in the reflective surface 28 of the optical disk 20. For example, the individual pits 27 may have a width of about 0.4 $\mu m$ and a length of between about 0.4–1.9 $\mu m$, though the pits may have any other suitable length and width. In alternate embodiments, the data structures formed in the reflective surface of the optical disk may have any other suitable features which change a quality of the reflected beam when the interrogating beam encounters these features. By way of example such features may be sequences of scarified and reflective surfaces or through holes in the reflective surface of the optical disk.

In the preferred embodiment, as shown in FIG. 2, the interrogating beam 100 generated by the light source 32 is focused by the lens 42 such that the focal point is located at the 'bottom' surface of the pits 27 in the reflective surface 28 of the optical disk 20. When the interrogating beam 100 is incident on the surface of a pit 27, the interrogating beam 100 is reflected by the pit surface as a reflected beam 102. The reflected beam 102 passes through the lens 42 (now acting as a collimator for the reflected beam) and is then deflected by the beam splitter 38 to strike the photodetector 34 in the scanning head 30. When the interrogating beam 100 is instead directed at a land 25 of the reflective surface 28, a lesser amount of the beam 100 is reflected back to be detected by the photodetector 34. This is because the surface of the land 25 is located at a different depth then the focal depth of the interrogating beam 100.

Alternatively, the interrogating beam 100 generated by the light source may be focused by the lens at the surface of the lands 25 and not the pits 27.

In either case, it can be appreciated that the change in reflectivity between two states (corresponding to whether the interrogating beam 100 is incident on a pit 27 or on a land 25), provides a mechanism to encode binary data (i.e., ones and zeroes) into the surface of the disk.

The preferred embodiments of the present invention will be described hereafter only with reference to the case where the interrogating beam 100 is focussed at the surface of the pits 27 in the reflective surface 28 of the optical disk 20, though the teachings of this invention are equally applicable to the case where the interrogating beam is instead focussed at the surface of the lands 25.

Figure 3A:
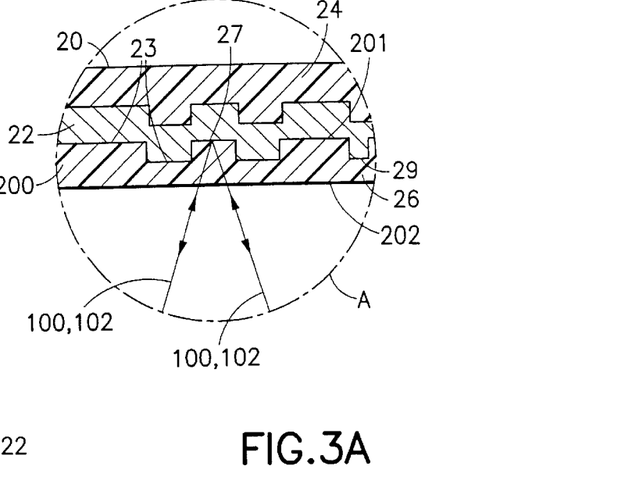
FIGS. 3A and 3B are a first pair of enlarged partial cross-sectional views showing a portion of the optical disk in FIG. 2 according to a first embodiment of the invention, specifically an optically deformable photopolymer layer embodiment, wherein the portion of the disk is shown in FIGS. 3A and 3B both before and after, respectively, scanning by an optical beam.
Figure 3B:
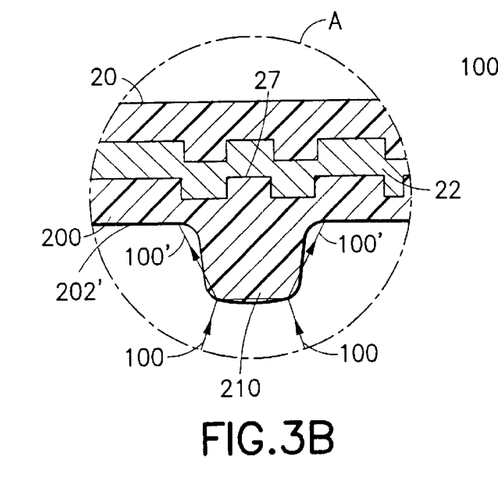

Referring now to FIGS. 3A and 3B, there is shown an enlarged cross-sectional view of a portion A of the optical disk 20 in accordance with a first embodiment of this invention. The optical disk 20 is constructed so as to include a surface relief photopolymer layer 200. The surface relief photopolymer layer 200 is comprised of one or more polymers, such as, by example, an azobenzene containing polymer. It is known that an azobenzene containing polymer is capable of exhibiting a surface deformations in response to a presence of an optical intensity gradient.

Reference in this regard may be had to an article entitled "Gradient force: The mechanism for surface relief grating formation in azobenzene functionalized polymers", Applied Physics Letters, Vol. 72, No. 17, pps. 2096–2098, Apr. 27, 1998, J. Kumar et al. The authors report on the derivation of a model for the formation of holographic surface relief gratings in azobenzene functionalized polymers. Forces leading to migration of polymer chains upon exposure to light in the absorption band of an azo chromophore are attributed to dipoles interacting with the gradient of the electric field present in the polymer material. The authors further report that an efficient trans-cis cycling in the azobenzenes allows cooperative movement of the chromophores under the influence of gradient forces.

In accordance with the teachings of this invention the surface relief photopolymer layer 200 is disposed on the optical disk 20 such that the interrogating beam 100 passes through the layer 200 when the beam 100 interrogates the data structures 23 on the reflective layer 22 of the optical disk 20. The surface relief photopolymer layer 200 in this case forms the lower layer of the optical disk 20. One surface 201 of the photopolymer layer 200 interfaces on an adjoining layer of the optical disk 20 and the opposite surface 202 of the photopolymer layer is a free or unconstrained surface (see FIG. 3A). In this preferred embodiment, the surface relief photopolymer layer 200 is deposited by appropriate methods (e.g. spraying or spin distribution) directly against the reflective surface 28 of the reflective layer 22 in the optical disk 20. In alternate embodiments, the surface relief photopolymer layer may be deposited on an intermediate substrate between the reflective layer of the optical disk and the photopolymer layer, such that again the photopolymer layer has an unconstrained surface.

FIGS. 3A and 3B respectively show the surface relief photopolymer layer 200 in an initial or undeformed condition, before exposure to the interrogating beam 100, and then in a deformed condition after exposure to the interrogating beam 100 (FIG. 3B may not be drawn to scale). The surface relief photopolymer layer 200 is exposed to the interrogating beam 100 when the optical disk 20 is scanned by the optical scanning head 30 (see also FIG. 2).

As shown in FIG. 3A, when the optical disk is first scanned and the surface relief layer 200 is in an undeformed condition, the interrogating beam 100 is focussed to penetrate through the surface relief layer 200 and be reflected as a reflected beam 102 from the surface of the pits 27. Thus, the disk may be read in the normal manner as previously described. However, exposure of the surface relief photopolymer layer 200 to the interrogating beam 100 also causes a deformation 210 in the unrestrained surface 202' of the photopolymer layer 200, as shown in FIG. 3B. The outwardly protruding deformation 210 in the photopolymer layer 200 changes an amount of polymer material through which the beam must travel and, due at least to the fact that this additional material has an index of refraction that differs from air, the interrogating beam 100 experiences beam aberration, resulting in a defocusing of the interrogating beam. This defocusing is sufficient to cause a change in the amount of reflected light that is received by the photodetector 34, and to thus cause at least a portion of the disk to be read incorrectly, which is the desired result. As such, errors are generated in subsequent attempts to read the optical disk.

It has been observed that surface relief deformations, created optically or by the evaporative mechanism of this invention, of but a few hundred nanometers can be sufficient to cause an optical disk to become unreadable, or to significantly diminish readout fidelity due to induced readout beam tracking problems. More particularly, the interrogating beam 100 generated by the light source 32 of the scanning head 30 (see FIG. 2) is focussed to penetrate through the undeformed surface relief photopolymer layer 200 and form a spot size of less than, for example, 1 $\mu$m at the surface of the pits 27. The highly focussed interrogating beam 100 creates a large optical intensity gradient of approximately $10^9$ mW/cm$^3$. The unconstrained surface 202 of the surface relief photopolymer layer 200 undergoes surface relief modulation in response to optical intensity variations in the Mw/cm$^2$ range over micron scale lengths (i.e. an optical intensity gradient of around 10 Mw/cm$^3$). Thus, when subjected to the high intensity gradient generated by the interrogating beam 100 focussed at the surface of the pits 27, the unconstrained surface of the surface relief photopolymer layer 200 undergoes large surface deformations 210 (see FIG. 3B). When the surface relief deformation 210 in the surface 202' grows to some threshold size, it causes an aberration of the interrogating beam 100 which is thus no longer focused at the surface of the pits 27 with sufficient acuity to be reflected as a reflected beam 102 detectable by the photodetector 34 (see FIG. 2). This results in readout failure. The exposure time for the unrestrained surface 202 to form a surface deformation of the desired size to cause aberration of the interrogating beam is dependent on the polymer blend and viscosity of the of the surface relief layer 200. The polymer blend and viscosity of the photopolymer in the layer 200 may be selected such that surface relief deformations 210 of the desired size are formed immediately after but not during application of the interrogating beam 100 when reading the disk 20 for the first time. This in effect results in the disk being rendered unreadable after the disk is read one time. Alternatively, the polymer blend and viscosity of the surface relief layer 200 may be selected to form the surface relief deformation of desired size after a predetermined number of applications of the interrogating beam, which consequently renders the disk unreadable after the disk has been read the predetermined number of times. In this regard the readout procedure can be modified so as to repetitively scan the interrogating beam over the same portion(s) of the disk surface, thereby insuring that the surface relief polymer will be affected.

In accordance with this embodiment of the invention, a method for rendering the optical disk 20 unreadable by a play process includes the steps of: a) providing the optical disk 20 with a surface relief photopolymer layer 200 which undergoes surface deformation at an unconstrained surface in the presence of an optical intensity gradient, as can be generated by the interrogating beam 100; and b) irradiating the surface relief photopolymer layer with the interrogating beam 100 for inducing at least one surface relief deformation in the unconstrained surface of the photopolymer layer. The surface relief deformation thus induced during the play process causes an aberration in the interrogating beam, which prevents focussing of the interrogating beam at desired locations on the features of the data structures 23 during subsequent readout processes. This results in a failure to readout the data on the disk during a subsequent readout process.

Figures 7, 8:
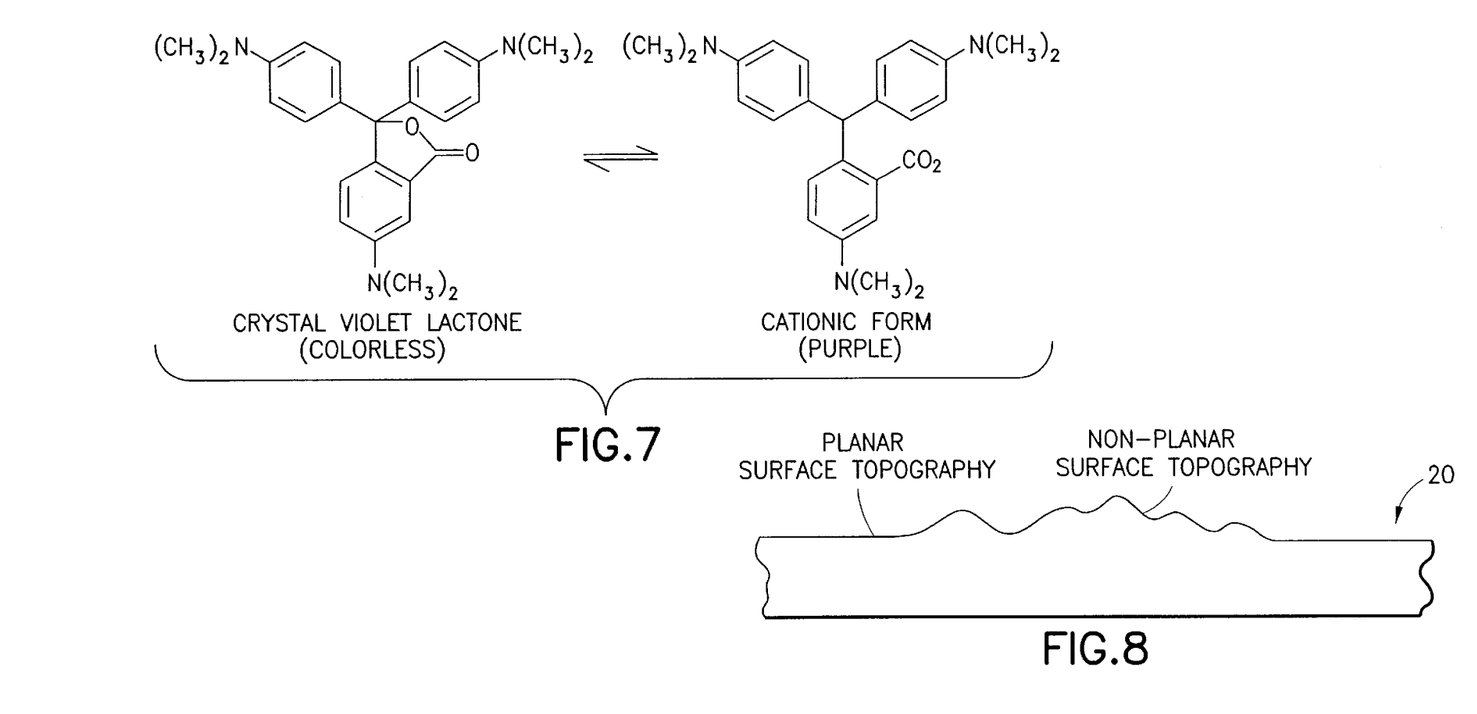
FIG. 7 illustrate a colorless lactone form (crystal violet lactone) and its cationic (colored) form, and is useful in explaining an embodiment of this invention that employs an evaporative method for rendering an optically readable media unreadable.
FIG. 8 is an enlarged cross-sectional view of a portion of an optically readable media having a surface topography that is modified from a planar profile, and which can be used to detrimentally affect the tracking operation of the readout device in accordance with the teachings of this invention.

FIG. 8 is an enlarged cross-sectional view of a portion of an optically readable media 20 having a surface topography that is modified from a planar profile, and which can be used to detrimentally affect the tracking operation of the readout device in accordance with the teachings of this invention. In this embodiment the planar surface topography is modified to the non-planar surface topography (not shown to scale in FIG. 8) by the use of a photoresponsive polymer as described above, or through one of the evaporative techniques described below, or by providing a surface layer that interacts with a substance in the atmosphere, such as oxygen, water vapor, or carbon dioxide. In these cases it is not necessary to modify the transparency of the surface layer to the readout beam, such as by increasing its radiation absorbing properties through a color change. Instead, the varying surface topography, and its deviation from the expected planar surface layer topography, is sufficient to detrimentally affect the tracking operation of the readout device.

Figure 4A:
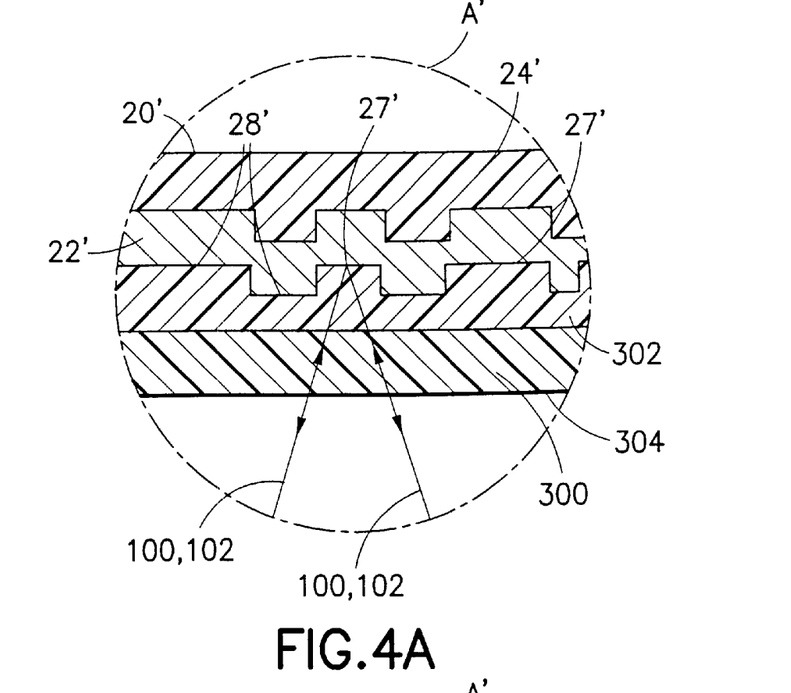
FIGS. 4A and 4B are a first pair of enlarged partial cross-sectional views showing a portion of the optical disk in FIG. 2 according to a second embodiment of the invention, specifically an optically induced reflectivity modification embodiment, wherein the portion of the disk is shown in FIGS. 4A and 4B both before and after, respectively, scanning by an optical beam.
Figure 4B:
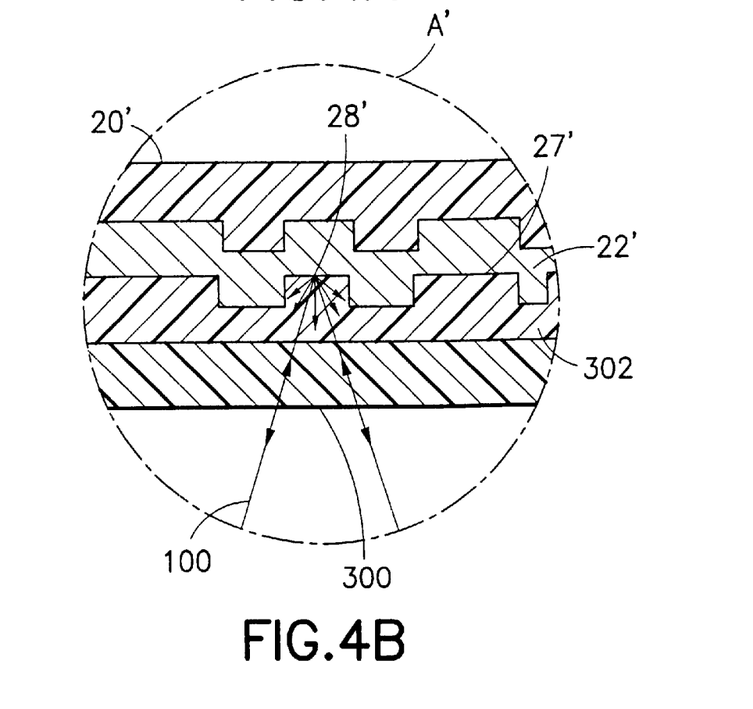

Referring now to FIGS. 4A and 4B, there is shown an enlarged cross-sectional view of Section A' of the optical disk 20' in accordance with a second embodiment of the present invention. The optical disk 20' in the second embodiment of the invention is substantially similar to the optical disk 20 described previously with reference to FIG. 2, except as otherwise noted below. As seen in FIGS. 4A and 4B, in this second embodiment the optical disk 20' includes an oxygen ($O_2$) loaded photosensitizer layer 300. The photosensitizer layer 300 is disposed on the optical disk 20' such that the interrogating beam 100 passes through the photosensitizer layer 300 when the optical disk 20' is being scanned by the optical scanning head 30 (see FIG. 2). The photosensitizer layer 300 may be separated from the reflective layer 22' of the optical disk 20' by a diffusion barrier 302. The lower surface 304 of the photosensitizer layer 300 may be sealed from the environment by some means, such an impervious polymer layer.

When the optical disk 20' is scanned with the optical scanning head 30, the interrogating beam 100 generated by the light source 32 passes through both the photosensitizer layer 300 and the diffusion barrier 302 and is focussed at the surface of the pits 27' in the reflective layer 22' of the optical disk. Correspondingly, the focussed interrogating beam 100 is then reflected from the reflective aluminum surface of the pits 27' as a reflected beam 102 detectable by the photodetector 34 in the scanning head 30 as mentioned previously (see FIG. 2). Irradiation of the photosensitizer layer 300 with the interrogating beam 100 generates singlet oxygen ($^1O_2$) in the oxygen ($O_2$) loaded photosensitizer layer 300. The highly reactive singlet oxygen ($^1O_2$) generated in the photosensitizer layer 300 diffuses through the diffusion barrier to the reflective surface of the optical disk and reacts with the metal in the reflective surface so as to oxidize the reflective surface. Oxidation of the reflective surface, at least in the pits 27' of the optical disk, degrades its reflectivity such that when the interrogating beam 100 strikes the oxidized surface the reflection of the interrogating beam is diminished. The decrease in reflectivity may be interpreted as the presence of a land 25, and not a pit 27, thereby resulting in a readout failure, which is the desired result.

More specifically, and by way of example, the photosensitizer layer 300 contains one or more photosensitizer compounds in combination with one or more solvents, such as for example methanol, acetone, a 10% freon/ethanol mixture, or a 1% freon/ethanol mixture. The solvent provides a source of molecular oxygen ($O_2$) internal to the photosensitizer layer 300.

Figure 6:
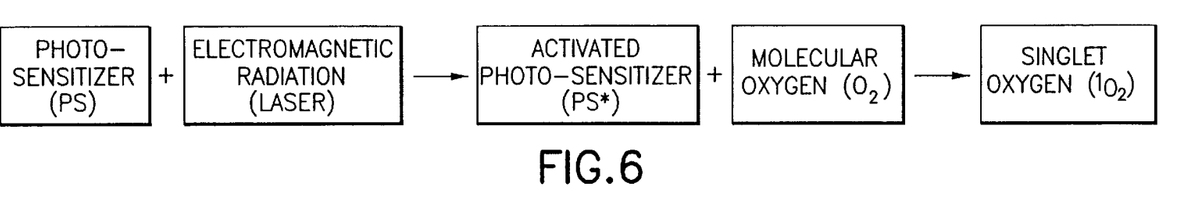
FIG. 6 is a flow chart diagrammatically depicting generation of singlet oxygen in a photosensitizer layer of the optical disk shown in FIG. 2, according to the reflectivity modifying embodiment shown in FIGS. 4A and 4B.

Referring to FIG. 6, and in accordance with the present invention, a combination of the photosensitizer compound (PS) plus electromagnetic radiation (i.e. light) having a wavelength of about 650 nm activates the photosensitizer, wherein the activated photosensitizer may be indicated as PS*. The activated photosensitizer then combines with non-atmospheric molecular oxygen ($O_2$) to produce singlet oxygen ($^1O_2$). In this embodiment of the invention, this reaction occurs within the photosensitizer layer 300 upon application of the interrogating laser beam 100, as when scanning the optical disk 20'. Hence, in the region of the photosensitizer layer 300 through which the interrogating beam passes, the photosensitizer compound becomes activated and combines with molecular oxygen ($O_2$) provided from the solvent which is internal to the layer 300 to produce the singlet oxygen ($^1O_2$). After generation in the photosensitizer layer 300, the singlet oxygen ($^1O_2$) proceeds to diffuse through the diffusion barrier 302 towards the reflective surface of one or more of the pits 27'. The singlet oxygen ($^1O_2$) reaches the reflective surface and begins to chemically attack the metal after a delay time $T_D$. The delay time $T_D$ is sufficient to allow the interrogating beam 100 to be reflected as reflected beam 102 by the surface of the pit 27', and hence allow readout of the data encoded therein before the singlet oxygen ($^1O_2$) attacks the pit surface. Thus, the diffusion barrier 302 can be employed to delay oxidation of the reflective surface 28' of the optical disk until readout of the disk has been completed at least once.

The delay time $T_D$ for the singlet oxygen ($^1O_2$) to diffuse through the diffusion barrier 302 depends on the thickness h of the diffusion barrier 302 and the diffusivity D of the diffusion barrier to singlet oxygen ($^1O_2$). The relation between the diffusion delay time $T_D$ the thickness h and diffusivity of the barrier 302 is generally described by the equation:

$$T_D = \frac{h^2}{D} \tag{1}$$

The diffusion barrier 302 comprises an appropriate medium which does not quench singlet oxygen ($^1O_2$) and has a controlled diffusivity D. For example, the diffusivity D of the diffusion barrier 302 may vary in a range from about $10_{-5}$ to $10_{-9}$ cm$_2$/sec depending on the material selected for the barrier 302. Therefore, the delay time $T_D$ may be controlled to be greater than the time required to read the data encoded on the reflective layer 22' of the disk 20' by selecting a material with the appropriate diffusivity D and selecting an appropriate thickness h for the diffusion barrier 302. However, the delay time $T_D$ is constrained by the lifetime ($T_1$) of singlet oxygen ($^1O_2$). The lifetime $T_1$ of singlet oxygen ($^1O_2$) is a function of the hydrophobic and paramagnetic properties of the host. Examples of general lifetimes $T_1$ for singlet oxygen ($^1O_2$) for different solvents are given below:

| $T_1$ ($\mu$sec) | Solvent |
| --- | --- |
| 7 | methanol |
| 45 | acetone |
| 150 | freon/ethanol (10%) |
| 1400 | freon/ethanol (1%) |

Thus the diffusion barrier 302 separating the photosensitizer layer 300 from the reflective layer 22 of the optical disk is suitably sized to provide a delay time $T_D$ for singlet oxygen diffusion which is both greater than the readout time ($T_{read}$) and less than the lifetime $T_1$ of singlet oxygen ($^1O_2$) (i.e. $T_1 > T_D > T_{read}$)

Two suitable materials for the diffusion barrier 302 are polyurethane or Teflon™, while suitable materials for the photosensitizer layer 300 include a pthalocyanine doped polymer, such as polycarbonate or PMMA, or a polymer doped with a porphyrin derivative, or other high triplet yield dye. Other suitable materials could be used as well, and these specifically listed materials should not be read in a limiting sense upon the practice of this invention.

Figure 5A:
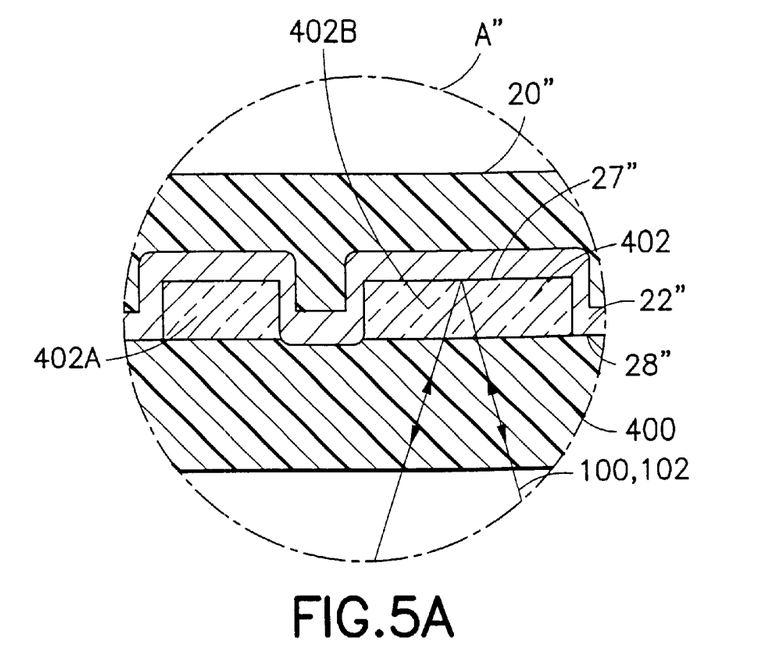
FIGS. 5A and 5B are a first pair of enlarged partial cross-sectional views showing a portion of the optical disk in FIG. 2 according to a third embodiment of the invention, specifically an optically cured photopolymer embodiment, wherein the portion of the disk is shown in FIGS. 5A and 5B both before and after, respectively, scanning by an optical beam.
Figure 5B:
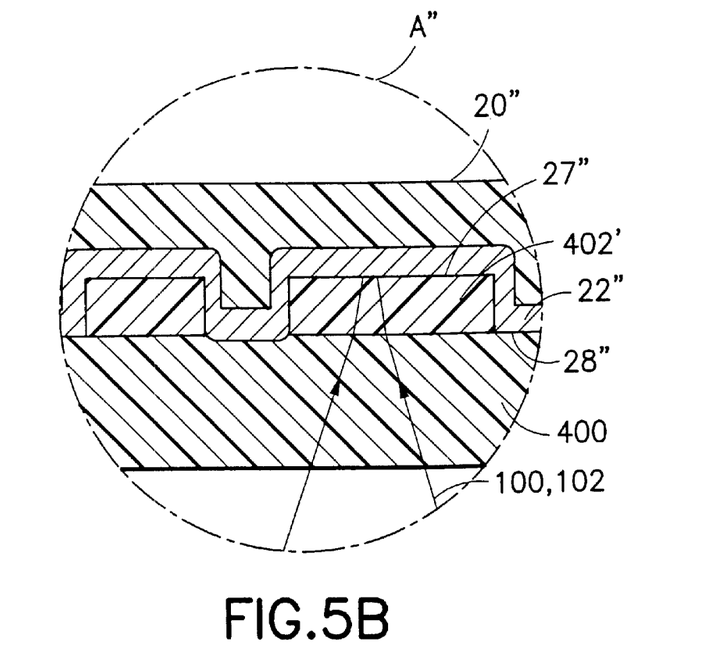

Referring now to FIGS. 5A and 5B, there is shown an enlarged cross-sectional view of Section A" of the optical disk 20" in accordance with a third embodiment of this invention. The optical disk 20" in this embodiment of the invention is substantially similar to the optical disk 20 described previously with reference to FIG. 2, except as otherwise noted below. As seen in FIGS. 5A and 5B, the optical disk 20" in accordance with this embodiment includes a substrate 400 which may be formed from a polycarbonate material disposed generally against the reflective surface 28" of the reflective layer 22" in the optical disk. Included between the substrate 400 and the reflective surface 28" of the disk 20" are regions or pockets 402A, 402B of an uncured photopolymer 402. As shown in FIG. 5A, the photopolymer 402 is disposed within the pits 27" formed in the reflective layer 22" of the optical disk 20". In an uncured state, the index of refraction of the photopolymer 402 is such that the interrogating beam 100 generated by the light source 32 (see FIG. 2) passes through both the substrate 400 and the uncured photopolymer 402, and the interrogating beam 100 is focussed at the surface of the pits 27". The uncured photopolymer 402 is adapted to cure after illumination by light having a suitable wavelength, for example about 650 nm, though the photopolymer may be adapted to cure when irradiated with light having other wavelengths. Thus, illumination by the interrogating beam 100 from the optical scanning head 30 (e.g., laser light having a wavelength of about 650 nm) cures the photopolymer 402 after a given time period (i.e., causes cross-linking between the molecules of the photopolymer, resulting in a change of viscosity and a general solidification of the photopolymer).

After the photopolymer cures, the index of refraction of the photopolymer 402 changes such that the interrogating beam 100 directed at the pits 27" and passing through the cured photopolymer 402' (as shown in FIG. 5B) is no longer focussed at the surface of the pits 27". That is, the curing of the photopolymer material results in beam aberration, and a loss of focus within the pit 27". Therefore, in accordance with this embodiment of the invention, illuminating the uncured photopolymer 402 in the pits 27" of the optical disk 20", as when reading the disk for the first time or during multiple passes after the initial reading, cures the photopolymer. After being cured the photopolymer 402', such as that disposed in the pits 27", defocuses the interrogating beam 100 such that it is no longer reflected as reflected beam 102 detectable by the photodetector 34. This in turn causes a readout failure, which is the desired result.

The uncured photopolymer 402 preferably has a curing time which allows unencumbered first-time readout (i.e. the interrogating beam 100 is reflected by a pit 27" as the reflected beam 102 that is detectable by the photodetector 34 before the photopolymer cures) but prevents subsequent readout of the pit 27".

Suitable photocurable polymers, such as acrylic resins, include wavelength sensitized resins, such as those used generally in photolithography or in some rapid prototyping applications with, for example, argon or krypton excitation lasers. General reference with regard to photopolymers may be had to the inventor's U.S. Pat. No. 5,028,109, issued Jul. 2, 1991, entitled "Methods for Fabricating Frequency Doubling Polymeric Waveguides Having Optimally Efficient Periodic Modulation Zone and Polymeric Waveguides Fabricated Thereby".

Reference may also be had in the literature to other suitable photoresponsive polymers, such as those mentioned in U.S. Pat. No. 4,865,942, "Photohardenable Compositions Containing a Dye-Borate Complex and Photosensitive Materials Employing the Same", by Gottschalk et al.

The foregoing three embodiments of this invention render an optical disk 20, 20', 20" unreadable, or limit its viability to perhaps no more than four hours after first reading (i.e. playing) the optical disk with the optical scanning system 1. Furthermore the three embodiments of the present invention accomplish this without rendering the optical disk 20, 20', 20" susceptible to becoming unreadable prematurely from competing optical conditions such as, for example, sunlight or indoor lighting.

Typical indoor lighting will generally not adversely affect the viability of the optical disk 20, 20', 20" in the three preferred embodiments of the present invention. However, should the possible exposure to sunlight be of concern, then a narrow band filter material (not shown) may be deposited on the lower surface 26 of the disk to prevent sunlight activation of the polymeric medium(s) of choice.

It should be understood that the above description is merely illustrative of the invention. For example, the step of directing the interrogating beam may be performed by directing the beam at the optical disk for a continuous period of time sufficient to cause the reaction in the photopolymer layer 200, 402 or photosensitizer layer 300. Alternatively, the interrogating beam may be directed at the disk in discrete time periods which cumulatively trigger the reaction. Furthermore, the interrogating beam may be directed in discrete time periods during a single scan of the disk or over a multiple number of scans of the disk.

A fourth embodiment of this invention will now be described. This fourth embodiment has the object of providing a method for disrupting an optical signal such as that used in the reading of a DVD or CD by evaporation of a substance. This embodiment is thus also useful in the construction of optical disks that become unreadable after a period of time.

This method provides a means of generating color, which is capable of absorbing an interrogating light beam, by evaporation of a substance.

By way of introduction, it is known that certain substances become colored or change color upon changes in solvent or environment. An example is the class of lactone dyes that are used in carbonless copy papers. The colorless lactone form of the dye can be caused to "open" to the colored cationic form of the dye by absorption onto an acidic clay or other acidic substrate, by lowering of the pH of the lactone in solution, or by changing the polarity of the solvent in which the lactone is dissolved. The colorless lactone form and the colored cationic form of an exemplary lactone dye, crystal violet lactone, is shown in FIG. 7.

Polymers derived from phenol and formaldehyde have been shown to be effective in causing the opening of a lactone dye (see U.S. Pat. No. 4,578,690), presumably due to the acidic nature of the phenolic component. A test was performed using poly-p-(hydroxystyrene) obtained from Hoechst-Celenese (Mw=6300) to determine if this polymer would also cause crystal violet lactone to open and become colored. A solution of the polymer in THF was mixed with a small amount of crystal violet lactone and this solution was spotted on a glass plate and air dried. Upon drying a dark blue spot formed. It was observed that the polymer-lactone solution remained colorless until the mixture was dried, whereupon the intense color of the cationic form of the dye formed.

This mechanism forms the basis of this embodiment of the invention, that is, of using a mixture of solvents, one relatively volatile and a second one which is relatively non-volatile, to prepare the polymer-lactone solution. Upon drying of the solution, the less volatile solvent remains upon evaporation of the more volatile solvent, and the mixture remains colorless until the less volatile solvent evaporates over a period of time. Mixtures of poly-p-(hydroxystyrene) (PHS), ethanol (as the more volatile solvent), crystal violet lactone (CVL) and several less volatile solvents (LVS) were prepared. Drops of the mixtures were allowed to air dry at room temperature and the color of the remaining films were noted to see what effect the less volatile solvent had upon color generation.

Preparation of the solutions:

|  | PHS | ethanol | CVL | LVS | color |
|---|---|---|---|---|---|
| Solution #1 | 500 mg | 2.0 mL | 20 mg | 300 µL NMP | --- |
| Solution #2 | 500 mg | 2.0 mL | 20 mg | 300 µL TEGDME | + |
| Solution #3 | 500 mg | 2.0 mL | 20 mg | 300 µL BA | ++ |
| Solution #4 | 500 mg | 2.0 mL | 20 mg | 300 µL THN | +++ |

* ... denotes no color, +++ denotes intense color formation

| Solvent | Name | BP °C. | Z value |
|---|---|---|---|
| NMP | N-methyl pyrrolidinone | 202 | 65 |
| TEGDME | triethyleneglycol dimethyl ether | 216 | 60 |
| BA | benzyl alcohol | 205 | 75 |
| THN | tetrahydronaphthalene | 207 | 55 |

*The Z value is a measure of relative polarity. The values listed above are estimations.

From the above experiment, NMP was chosen as the best of the less volatile solvents tested since the polymer film remained colorless upon evaporation of the ethanol.

EXAMPLE #1

A solution of poly-p-(hydroxystyrene) (5 gm), ethanol (10 mL), crystal violet lactone (200 mg) and NMP (3.0 mL) was prepared. A few drops were applied to a glass slide and the mixture was allowed to air dry at room temperature. The film which formed was soft and tacky to the touch but it was colorless. Color formation was followed over the course of several days through the use of a spectrophotometer.

| Time (hours) | Optical Density (607 nm) |
|---|---|
| 0 | 0 |
| 18 | 0.181 |
| 85 | 0.242 |

Since the film formed in example #1 was soft and tacky formaldehyde was added to cross link the phenolic polymer.

EXAMPLE #2

A solution of poly-p-(hydroxystyrene) (5 gm), ethanol (10 mL), crystal violet lactone (220 mg), 28% ammonia (0.5 mL as a cross linking catalyst) and NMP (3.0 mL) was prepared. To this solution was added 37% aqueous formaldehyde (3.0 mL). A few drops were applied to a glass slide and the mixture was cured at about 65° C. on a hot plate until the film was hard. This took about 5 minutes. The film which formed was hard to the touch and it was colorless after curing. Color formation was followed over the course of several days through the use of a

| Time (hours) | Optical Density (607 nm) |
|---|---|
| 1 | 0 |
| 24 | 0.270 |
| 50 | 0.315 |

EXAMPLE #3

To test the color stability of the system on storage, a film was prepared as described in example #1. The air dried glass slide was sealed in a polyethylene zip-lock bag along with one drop of NMP to form a NMP saturated environment in the bag. The slide stored in this manner showed no color formation after one week at room temperature. Upon removal from the bag, color began to form as in examples 1 and 2. The slide was dark blue with an optical density of 0.875 at 605 nm. after five days in the air at room temperature.

The scattering of light rather than absorbance can also be used to attenuate an optical signal. An evaporative method to cause increased scattering can be achieved by mixing a polymer with a solid where there is a mismatch between the refractive indexes of the two materials, and then adding a solvent for the polymer which adjusts the refractive index of the polymer-solvent mixture to match that of the solid. Under these conditions the mixture is non-scattering or poorly scattering since there is a refractive index match between the polymer-solvent pair and the solid. However, slow evaporation of the solvent causes a mismatch between the remaining polymer and solid and, therefore, the scattering increases.

EXAMPLE #4

A solution of 1.0 gm of cellulose acetate butyrate (CAB, Mw=70,000, 13.5% acetyl, 37.5% butyryl, n=1.46) in 20 mL of ethyl acetate was prepared and to this solution was added 1.0 gm of silica gel (70–230 mesh, n about 1.50) and 600 µL of benzyl alcohol (n about 1.54). A drop of this mixture was placed on a glass slide and the ethyl acetate was allowed to evaporate to provide a clear, transparent film through which news print could easily be read. Upon standing in the air for two days the film became quite cloudy and news print could be read through the film only with difficulty.

In accordance with the teachings of this invention, one or both of the foregoing evaporative-based methods can be used to render an optically readable media, such as a DVD or CD, unreadable after a period of time. Referring by example to FIG. 2, the upper protective layer 24 could be comprised of one of the mixtures described in examples 1 and 2 above, which is initially colorless and transparent, but which becomes colored and absorbing after sufficient solvent evaporation has occurred. The upper protective layer 24 could also be comprised of the CAB-ethyl acetate solution referred to in example 4, which is initially colorless and transparent, but which becomes milky and scattering after sufficient solvent evaporation has occurred. While it may be preferred to have this layer exposed as a top-most layer, it is also within the scope of the invention to apply an overlayer, so long as the overlayer is sufficiently permeable to enable the evaporative process to occur.

It can be appreciated that this embodiment of the invention also does not require the presence of atmospheric oxygen, as the evaporation could take place as well in a vacuum, and neither does it require the presence of a lightbeam to catalyze or initiate the process, as the color change or increase in opacity and scattering can occur as well in a dark enclosure, so long as the evaporative process is not significantly impeded.

Other methods for attenuation of an optical signal can also be employed to practice this invention.

For example, it is well known that salts of a weak acid and a weak base in which either the acid or base or both are volatile will revert to the free acid and free base upon standing in the open due to the volatilization of one of the components. An example of this is the solid ammonium carbonate, which slowly sublimes in the open due to the formation of the volatile components of the salt, ammonia and carbon dioxide. This property may be used to generate color and thus optical absorption in several ways. For example, the salt of a volatile amine and a non-volatile acid component (carboxylic acid, phenol, etc.) may be mixed with a lactone dye, such as crystal violet lactone, or with an pH indicator dye. Volatilization of the basic (amine) component will leave the acidic component behind. The acidic component may be used to catalyze the opening of the lactone dye, or cause the color change in a pH indicator.

The volatilization of a gas can also be used to generate a color. For example, a water damp polymer film containing a pH indicator dye may be stored in an atmosphere of a gas whose water solution is acidic (e.g. carbon dioxide, sulfur dioxide) or basic (ammonia, trimethylamine etc.) Upon removal of the film from the atmosphere the volatile gas will evaporate from the water damp film, and the pH will change causing a color change in the pH indicator dye. This type of mechanism has been used to detect carbon dioxide and amines (see Mills, et al. Anal. Chem 1992, 64, 1383, Lakowicz et al., Biotechnol. Prog. 1998, 14, 326, and U.S. Pat. Nos. 5,183,763 and 5,846,836.)

The increase in absorbance or light scatter (or both) can be accomplished by coating a chemically reactive layer, exemplified by the various examples given above, on the surface of a disk, using methods such as a spin coating, spraying, slot coating, or vacuum deposition. Patterned deposition can be done by a printing process, such as silk screen or inkjet, or with masks using spray or vacuum coating. Alternately, the reactive layer may be prepared separately as an adherent plastic film, cut to size, and applied to the surface of the disk.

Furthermore, the timed readout disablement can occur by increasing scattering from the interrogating laser beam, thereby degrading the overall signal-to-noise ratio (SNR) level to an unacceptable level. This approach is less sensitive to changes in laser power, error correction codes, or improved detector design.

Further by example, the vacuum deposition of thin layers of sensitive inorganic materials, such as KBr or CsF, on the surface of the disk can provide a surface haze when exposed to an atmospheric substance, such as water vapor and/or carbon dioxide, thereby increasing at least one of the photoabsorption, the scattering, or the surface roughness, and thereby also decreasing the SNR.

Further by example, the evaporation of a volatile solvent from a polymer coating may lead to the precipitation of small scattering crystals, or the evaporation could lead to a phase change of a polymer or polymer mixture with concomitant light scattering.

Also, and as was discussed previously, the timed readout disablement can also occur by lowering the reflectivity of the reflective metal coated surface(s) of the disk. This method is sensitive to the same factors noted above for the absorbance increase. It should be noted that the corrosion of the buried reflective layer is essentially irreversible.

The adhesive layer in both CDs and DVDs can be modified to exploit the corrosive effects of air on metals. Since a goal of the instant invention is to provide short-lived disks, the use of different materials is an option, compatible with manufacturability. The composition of adhesive and plastic can be tailored to promote a corrosive reaction, once the disk packaging is removed. Also, the reflective layer itself can be made using metals more reactive than aluminum, such as potassium or calcium.

This invention can be practiced by providing an optically encoded medium with two or more of the foregoing embodiments. For example, an optical disk can be constructed so as to provide the surface deformation feature as well as the aluminum layer oxidation feature, or the evaporatively-driven absorption and/or scattering change in combination with the reflective metal oxidation, thereby further ensuring the effective destruction of the disk after being initially read.

Thus, various alternatives and modifications may be devised by those skilled in the art without departing from this invention. Accordingly, the present invention is intended to embrace all such alternatives, modifications and variances which fall within the appended claims.

What is claimed is:

1. A method for intentionally making an optically readable media unreadable by a play process, comprising steps of:

providing the media with an optically activated mechanism that causes a defocusing of a readout beam, thereby degrading reflection of the readout beam from a surface wherein information is encoded;

exposing the media to optical radiation for reading out the information; and during the step of exposing, initiating the operation of the optically activated mechanism;

wherein the step of initiating comprises steps of,
generating an optical intensity gradient in a layer disposed on the media; and in response to the generated optical intensity gradient, deforming a surface of the layer resulting in at least one of readout beam aberration or a degradation of a readout tracking function, wherein the step of providing provides the layer so as to comprise an azobenzene containing polymer.

2. A method for intentionally making an optically readable media unreadable by a play process, comprising steps of:
providing the media with an optically activated mechanism that causes a defocusing of a readout beam, thereby degrading reflection of the readout beam from a surface wherein information is encoded;
exposing the media to optical radiation for reading out the information; and
during the step of exposing, initiating the operation of the optically activated mechanism,
wherein the step of initiating is comprised of steps of,
irradiating a photocurable polymer region that comprises the media; and
in response to the irradiation, photopolymerizing the polymer, thereby changing an index of refraction of the polymer resulting in readout beam aberration.

3. An optically readable media capable of intentionally being made unreadable by a play process, said media comprising an optically activated mechanism that is responsive to light used to readout information for defocusing a readout beam, thereby degrading reflection of the readout beam from a surface wherein information is encoded, wherein said mechanism is comprised of a layer of polymer that is responsive to an optical intensity gradient generated by said readout beam for deforming a surface of said layer, resulting in readout beam aberration, wherein said layer comprises an azobenzene containing polymer.

4. An optically readable media capable of intentionally being made unreadable by a play process, said media comprising an optically activated mechanism that is responsive to light used to readout information for defocusing a readout beam, thereby degrading reflection of the readout beam from a surface wherein information is encoded, wherein said mechanism is comprised of at least one region comprised of photoresponsive polymer that is responsive to the readout beam for being photopolymerized, thereby changing an index of refraction of the photocurable polymer resulting in readout beam aberration.

5. A method for intentionally making an optically readable media unreadable, comprising steps of:
providing the media with a layer that is comprised of a volatile component and at least one other component;
removing at least some of the volatile component from the layer; and
causing an increase in at least one of photoabsorption or scattering or surface roughness with the remaining component.

6. A method as in claim 5, wherein the other component is comprised of a lactone dye.

7. A method as in claim 5, wherein the other component is comprised of crystal violet lactone.

8. A method as in claim 5, wherein the layer is comprised of poly-p-(hydroxystyrene), ethanol, crystal violet lactone and N-methyl pyrrolidinone.

9. A method as in claim 5, wherein the layer is comprised of poly-p-(hydroxystyrene), ethanol, crystal violet lactone, ammonia, N-methyl pyrrolidinone, and formaldehyde.

10. A method as in claim 5, wherein the layer is comprised of cellulose acetate butyrate, ethyl acetate, silica gel, and benzyl alcohol.

11. A method as in claim 5, wherein the layer is comprised of a salt of a volatile amine, a non-volatile acid component and a lactone dye.

12. A method as in claim 5, wherein the layer is comprised of a salt of a volatile amine, a non-volatile acid component and a pH indicator dye.

13. A method as in claim 5, wherein the layer is comprised of a water damp polymer film containing a pH indicator dye, wherein during storage the layer is exposed to an atmosphere of a gas whose water solution is one of acidic or basic, and wherein upon removal from storage a volatile gas evaporates from the water damp film, and the pH changes causing a color change in the pH indicator dye.

14. A method as in claim 5, and further comprising a preliminary step of constructing the layer as a separate component layer, and then a step applying the separate component layer to a surface of the optically readable media.

15. A method for intentionally making an optically readable media unreadable, comprising steps of:
providing the media with a layer that is comprised of a sensitive inorganic material;
exposing the layer to an atmosphere containing carbon dioxide; and
reacting the inorganic material with the carbon dioxide to cause an increase in at least one of photoabsorption or scattering or surface roughness.

16. An optically readable media comprising a patterned structure for encoding information that can be readout by application of light, said optically readable media further comprising a layer that is comprised of a volatile component and at least one other components, wherein removing at least some of the volatile component from the layer causes an increase in at least one of photoabsorption or scattering or surface roughness with the remaining component, thereby rendering at least a portion of the encoded information unreadable.

17. A media as in claim 16, wherein the other component is comprised of a lactone dye.

18. A media as in claim 16, wherein the other component is comprised of crystal violet lactone.

19. A media as in claim 16, wherein the layer is comprised of poly-p-(hydroxystyrene), ethanol, crystal violet lactone and N-methyl pyrrolidinone.

20. A media as in claim 16, wherein the layer is comprised of poly-p-(hydroxystyrene), ethanol, crystal violet lactone, ammonia, N-methyl pyrrolidinone, and formaldehyde.

21. A media as in claim 16, wherein the layer is comprised of cellulose acetate butyrate, ethyl acetate, silica gel, and benzyl alcohol.

22. A media as in claim 16, wherein the layer is comprised of a salt of a volatile amine, a non-volatile acid component and a lactone dye.

23. A media as in claim 16, wherein the layer is comprised of a salt of a volatile amine, a non-volatile acid component and a pH indicator dye.

24. A media as in claim 16, wherein the layer is comprised of a water damp polymer film containing a pH indicator dye, wherein during storage the layer is exposed to an atmosphere of a gas whose water solution is one of acidic or basic, and wherein upon removal from storage a volatile gas evaporates from the water damp film, and the pH changes causing a color change in the pH indicator dye.

25. A media as in claim 16, wherein said layer is applied by one of a coating or printing process or as an adhesively affixed separate component layer.

26. An optically readable media comprising a patterned structure for encoding information that can be readout by application of light, said optically readable media further comprising a layer that is comprised of a sensitive inorganic material wherein exposure of said layer to an atmosphere containing carbon dioxide causes a reaction between the inorganic material and the carbon dioxide to cause an increase in at least one of photoabsorption or scattering or surface roughness, thereby rendering at least a portion of the encoded information unreadable.

27. A method for preparing an optically readable disk to become optically unreadable after a period of time for intentionally limiting the usable lifetime of the disk, comprising steps of:

provi ding a disk having a surface with optically readable features;

spin coating a first layer over the surface, the first layer being comprised of a volatile compound and at least one other compound, wherein as a result of an evaporative process the removal of at least some of the volatile compound from the first layer results in a chemical reaction occurring in the at least one other compound, the chemical reaction causing an increase in photoabsorption in the first layer to light from a disk readout mechanism; and applying an overlayer over the first layer, the overlayer being sufficiently permeable so as to allow the evaporative process to occur.

28. A method as in claim 27, and further comprising a step of storing the disk in an enclosure that also contains a quantity of the volatile compound in order to inhibit the occurrence of the chemical reaction while the disk is stored in the enclosure.

29. A method as in claim 28, wherein the volatile compound is comprised of N-methyl pyrrolidinone (NMP).

30. An optically readable disk that becomes optically unreadable after a period of time for intentionally limiting the usable lifetime of the disk, comprising steps of:

a disk substrate supporting a surface with optically readable features;

a first layer disposed above the surface, the first layer being comprised of a volatile compound and at least one other compound, wherein as a result of an evaporative process the removal of at least some of the volatile compound from the first layer results in a chemical reaction occurring in the at least one other compound, the chemical reaction causing an increase in photoabsorption in the first layer to light from a disk readout mechanism; and an overlayer disposed above the first layer, the overlayer being sufficiently permeable so as to allow the evaporative process to occur.

31. A disk as in claim 30, wherein the disk is stored prior to the first use in an enclosure that also contains a quantity of the volatile compound in order to inhibit the occurrence of the chemical reaction while the disk is stored in the enclosure.

32. A disk as in claim 30, wherein the volatile compound is comprised of N-methyl pyrrolidinone (NMP).

* * * * *